United States Patent [19]

Reinisch et al.

[11] 3,965,096

[45] June 22, 1976

[54] ULTRAVIOLET AND THERMALLY STABLE POLYMER COMPOSITIONS

[75] Inventors: Ronald F. Reinisch, Palo Also; Hermilo R. Gloria, San Jose; Ronald E. Goldsberry, San Jose; Michael J. Adamson, San Jose, all of Calif.

[73] Assignee: The United States of America as represented by the Administrator of the United States National Aeronautics and Space Administration, Washington, D.C.

[22] Filed: Nov. 8, 1973

[21] Appl. No.: 414,043

Related U.S. Application Data

[62] Division of Ser. No. 321,179, Jan. 5, 1973, Pat. No. 3,803,090.

[52] U.S. Cl. .......................... 260/240 G; 260/566 B
[51] Int. Cl.² ........................................ C07C 119/00
[58] Field of Search ..................... 260/566 B, 240 G

[56] References Cited
UNITED STATES PATENTS 2,870,206   1/1959   Meyer .............................. 260/566 B

*Primary Examiner*—Gerald A. Schwartz
*Attorney, Agent, or Firm*—Darrell G. Brekke; Armand G. Morin, Sr.; John R. Manning

[57] ABSTRACT

A new class of polymers is provided, namely, poly (diarylsiloxy) arylazines. These novel polymers have a basic chemical composition which has the property of stabilizing the optical and physical properties of the polymer against the degradative effect of ultraviolet light and high temperatures. This stabilization occurs at wavelengths including those shorter than found on the surface of the earth and in the absence or presence of oxygen, making the polymers of the present invention useful for high performance coating applications in extraterrestrial space as well as similar applications in terrestrial service. The invention also provides novel aromatic azines which are useful in the preparation of polymers such as those of the present invention.

7 Claims, 3 Drawing Figures

ULTRAVIOLET AND THERMALLY STABLE POLYMER COMPOSITIONS

The invention described herein was made by employees of the United States Government and may be manufactured and used by or for the Government for Governmental purposes without the payment of any royalties thereon or therefor.

CROSS REFERENCES TO RELATED APPLICATION

This is a division, of application, Ser. No. 321,179 filed Jan. 5, 1973, now U.S. Pat. No. 3,803,090, Pat. Apr. 9, 1974.

BACKGROUND OF THE INVENTION

1. Field of the Invention

Plastic materials having stable properties under conditions of ultraviolet light and high temperatures in the presence or absence of oxidizing atmospheres.

2. Description of the Prior Art

Heretofore, in the preparation of ultraviolet stable polymer films and coatings, a conventional practice has been to mix within the matrix or to coat the surface of the polymer with an ultraviolet absorbing compound, or opaque filler such as carbon black, talc, clay or a pigment.

Although this invention is not predicated on its theory of operation, it is believed that the poly (diphenylsiloxy) arylazines of the present invention derive their photostability from the contribution of the repeating units to the rapid deactivation of electronically excited states, a process which is believed to allow the polymer to relax to the ground state at a rate faster than any bond scission process.

Many of the protective compounds of the prior art are low molecular weight substances which are incorporated in the polymer melt. coated on the surface of the polymeric structure or dissolved in the casting solvent. While many of the substances involved are effective when used in relatively thick layers or high concentrations, the results obtained therewith are far from optimum because the incorporation of 0.01 to 10% by weight of stabilizer often adversely affects the physical, chemical and optical properties for which the polymeric materials were initially chosen. Moreover, conventional techniques of protection from ultraviolet have been tailored to terrestrial conditions and are often deficient in the space environment. For example, the commercially employed benzophenone derivatives actually become sensitizers for the photodegradation of polymers in vacuum at wavelengths below 3000 A.

A further deficiency of commercial ultraviolet absorbers is that as additives they show a tendency to be leached out of plastics by solvents, and to migrate to the surface or to be lost by evaporation during the hot molding operations and other thermal processing to which plastics may be subjected. This loss of absorber is accompanied by a loss of protection against photodegradation.

The use of copolymerizable groups as the ultraviolet stabilizer has also been suggested as a means of covalently binding the stabilizer in the polymer chain. However, in practice only a small fraction of the copolymerizable stabilizer is actually incorporated in the polymer chain, leaving the unreacted stabilizer to be leached out in the same manner as the additives mentioned above. Since the randomly incorporated stabilizer constitutes only a small fraction of the polymer chain, no protection is afforded to long stretches of the chain that are devoid of stabilizer groups.

Many of the commercial polymers that have a degree of photostability are not soluble in common solvents and therefore cannot be used economically in paints, coatings or films.

Heretofore, 2,2'-dihydroxynaphthalazine (2,2'-DHNZ) has been described [N. Kaistianpaller & D. DuHon, Appl. Optics 3,287 (1964)] as a yellow organic phosphor with constant fluorescent effeciency between 1000 and 3500 A, but there has not been any recommendation for the use of such compounds as a repeating mer unit in an alternating copolymer with diphenylsiloxane units to enhance the ultraviolet stability of a polymer.

Alternating copolymers composed of aryldioxy and diphenylsiloxy repeating units have been prepared by the melt condensation of aryldiols and bis-(anilino)diphenylsilane. [J. E. Curry & J. D. Byrd, J. Appl. Polymer Sci., 9, 295 (1965)] Although the resulting polymers displayed good thermal stability up to 300°C and coatings cast from tetrahydrofuran had considerable ultraviolet stability in vacuum, they did not contain the diazine linkage, (—CH=N—N=CH—) as the basic repeating unit which is essential to achieve the objects of the present invention.

Sulfonated derivatives of 2,2'-dihydroxynaphthalazine have been described [U.S. Pat. No. 2,818,432] as useful fluorescent dyes for animal fibers or polyamides. However, the resulting dyed polymers did not contain a diazine linkage as the basic repeating unit of the polymer backbone because the 2,2'-dihydroxynaphthalazine group was attached to the protein or polyamide as a pendant side-chain through the sulfonic acid group.

Polymers derived from hydrazine have been described [U.S. Pat. No. 2,957,852] as elastomers that exhibit improved stability to ultraviolet light. However, the repeating units of these polymers were

linked through carbonyl groups where X and X' represent hydrogen or a monovalent organic radical. These elastomers, although derived from hydrazine, do not contain the diazine linkage essential to the present invention.

Heretofore, polymers based on the reaction of the hydrazine class of compounds and halosiloxanes have been described [U.S. Pat. No. 2,877,201] as being water repellent compounds useful for application to aircraft windshields. However, since this reaction is limited to linear aliphatic hydrazine compounds having at least one functional hydrogen atom attached to each nitrogen atom, it is not possible to prepare by this method polymers which have the diazine linkage as the repeating unit in the polymer backbone as described in the present invention.

SUMMARY OF THE INVENTION

This invention relates to a new class of polymers whose basic chemical composition has the property of stabilizing the optical and physical properties of the polymer against the degradative effect of ultraviolet light and high temperatures. More particularly, this stabilization also occurs at wavelengths shorter than those found on the surface of the earth, and in the absence or presence of oxygen; making this invention useful for high performance coating applications in extraterrestrial space as well as in terrestrial service.

The polymers are particularly useful for coating metal or glass surfaces employed on the exterior panels of spacecraft, improved protective coatings for solar cells, photo-stable window fabrication, laminating optical elements, photo-stable paints and thermal control coatings, coatings for stabilizing inflatable structures, and numerous other structural applications where the combination of photo-stability below 3000 A and thermal stability in the region of 480°F (250°C) is required.

An object of the present invention is to provide a novel and useful photo-stable polymer film having desirable thermal and optical properties that can be conveniently prepared from economical starting materials, e.g., hydroxylated arylazines and diphenyldihalosilanes.

Another object is to provide an efficient and economical process for preparing these ultraviolet and thermally stable polymers, which is adaptable to conventional, batch-type, melt polymerization processes and which can be carried out with existing plants and equipment.

A further object is to provide an ultraviolet stable polymer which avoids the use of sacrificial additives to achieve protection of the host polymer from photodegradation.

A still further object of this invention is to provide a plastic film which can be formed by casting from volatile, economical organic solvents and which can be cast with a doctor knife and dried at room temperature in a forced draft enclosure.

Another object of the invention is to provide a transparent, plastic layer that has excellent adhesion to glass. This property of bonding to glass as well as ultraviolet and thermal stability make the poly (diphenylsiloxy) arylazines useful compounds for laminating aircraft windshields or spacecraft windows. The bonding agent does not suffer significant photodegradation when subjected to ultraviolet radiation in the wavelength region below 3000 A.

Another object of the invention is to provide a polymer that does not support combustion. Purified poly(-diphenylsiloxy)- arylazines melt at about 170°C, and resolidify with no decomposition. However, an increase in temperature above 195°C is accompanied by the loss of nitrogen and the transformation of the diazine group to a vinyl group, (—CH = CH—). Subjecting the polymer to an oxy-pyropane flame (~2500°C) rapidly led to the formation of a light brown solid. As the heating continued, the char that formed glowed a bright orange color. Upon removal of the flame, all combustion ceased. During exposure to the flame, the char that formed expands and protects the base polymer. Removing the char exposes a layer of virgin polymer which had not burned.

Another object of the invention is to provide a photo-stable polymer that can be fabricated without thermal degradation into desired shapes by the use of conventional compression molding techniques and which can be carried out with existing compression and injection molding equipment. Moreover, in applications requiring a low molecular weight pre-polymer that can be thermally transformed to a high molecular weight polymer, the poly(diphenylsiloxy) arylazines are useful polymeric materials. For example, heating poly(4,4'-diphenylsiloxy)benzalazine( of molecular weight 6000 ) in vacuum or in air to its melting point 180°C, caused aniline to be released and the polymer solidified to form polymer with a molecular weight of 8000. This enhancement in molecular weight during thermoplastic processing is valuable, also, in applications requiring the transformation of a low molecular weight film prepared by film casting, into a high molecular weight film by subsequent thermal processing.

A further object of the invention is to provide new aromatic azines as well as new aldehydic precursors required for the synthesis of the required monomeric azines. In accordance with the present invention, the following new aromatic azines were prepared: 2,2', 6, 6'-tetrahydroxynaphthalazine (2,2',6,6'-THNZ); 2,2',7,7'-tetrahydroxynaphthalazine (2,2',7,7'-THNZ); 2,2',7,7'-tetraacetoxynaphthalazine (acetate ester) (2,2',7,7'-TANZ); 2,2'-dihydroxy-5,5'-dimethoxybenzalazine (2,2'-DH-5,5'-DMBZ); 2,2'-diacetoxy-5,5'-dimethoxybenzalazine (acetate ester) (2,2'-DA-5,5'-DMBZ); 2,2',5,5'-tetrahydroxybenzalazine (2,2',5,5'-THBZ) and 2,2'-dimethoxy-5,5'-dimethoxybenzalazine (2,2'-DM-5,5'-DMBZ). Two new aromatic aldehydes are 2,2'-dihydroxy-5,5'-dimethoxybenzaldehyde and 2,2'-dimethoxy-5,5'-dihydroxybenzaldehyde.

DESCRIPTION OF THE PREFERRED EMBODIMENTS

Figure 1:
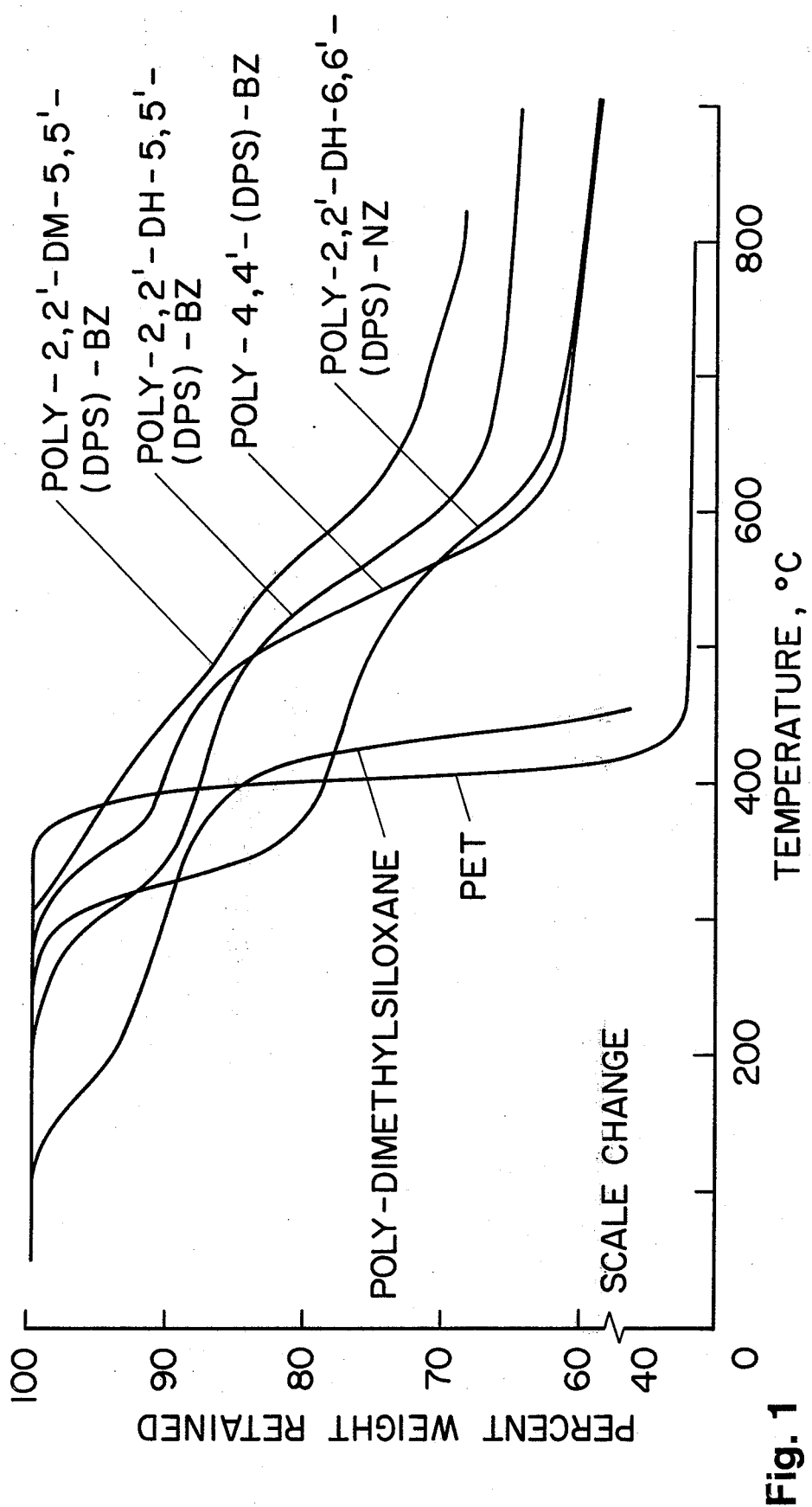
FIG. 1 is a graph showing the thermal stability of various polymers made in accordance with the present invention.

The compounds of the present invention are described as aromatic and substituted aromatic azine-aromatic siloxane copolymers and have the general formula:

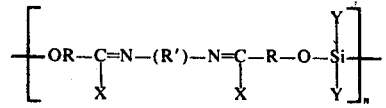

wherein $n$ represents an integer ranging from 3 to 500-, preferably about 15 to 90, ; R represents a substituted aromatic group or condensed ring system; X stands for a hydrogen atom, an alkyl radical or an aryl radical; Y represents a phenyl or methyl radical; and R' is either a phenyl group or a single covalent linkage.

The compounds of the present invention are made by condensing a multihydroxylatediarylazine monomer with bis(anilino)diaryl or bis(anilino) dialkyl silane monomer under typical melt polymerization conditions as shown in the following equation:

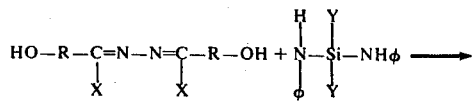

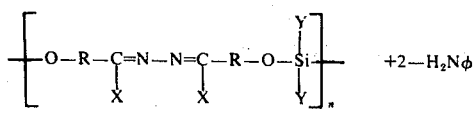

where φ represents the phenyl radical, and where n has values from about 3 to 500 and preferably 15 to 90.

Although any disubstituted arylazine is suitable for reaction with the silane, and the group designated X could be any alkyl or aryl group rather than hydrogen, examples of preferred hydroxyarylazines include 4,4'-dihydroxy-1,1'-benzalazine (4,4'-DHBZ); 5,5'-dihydroxy-1,1'-benzalazine (5,5'-DHBZ); 3,3'-dihydroxy-1,1'-benzalazine (3,3'-DHBZ); 2,2',5,5'-tetrahydroxy-1,1'-benzalazine (2,2',5,5'-THBZ); 2,2',4,4'-tetrahydroxy-1,1'-benzalazine (2,2',4,4'-THBZ); 2,2'-dimethoxy-5,5'-dihydroxy-1,1'-benzalazine (2,2'-DM-5,5'-DHBZ); 4,4'-dihydroxy-1,1'-naphthalazine (4,4'-DHNZ); 2,2',6,6'-tetrahydroxy-1,1'-naphthalazine (2,2',6,6'-THNZ); 2,2',7,7'-tetrahydroxy-1,1'-naphthalazine (2,2',7,7'THNZ); and 2,2'-dimethoxy-6,6'-dihydroxy-1,1'-naphthalazine (2,2'-DM -6,6'-DHNZ).

The aryl azines are prepared by methods well known to those skilled in the art and consists of causing an ethanolic solution of the appropriate aldehyde to react with an aqueous solution of hydrazine sulfate in a nitrogen atmosphere. Although any hydroxy substituted aromatic aldehyde may be suitable for the preparation of the required arylazine monomer, a series of new aldehydes in 2,2'-dihydroxy-5,5'-dimethoxybenzaldehyde and 2,2'-dimethoxy-5,5'-dihydroxybenzaldehyde. Aromatic aldehydes that have a methoxy group in the 2(ortho) position of the benzene ring and a hydroxy group in one of the remaining unsubstituted positions may be prepared by the method of F. M. Dean. [Tetrahedron Letters 4153 (1966)], by allowing an aromatic aldehyde containing two methoxy groups to react with boron trichloride. The methoxy group in the 2 position is not cleaved but the remaining ether group is selectively cleaved to yield a hydroxy group.

Examples of diaryl- or dialkyl- or arylalkyl- silylamines that are suitable for use in the present invention include: bis(anilino)diphenylsilane, bis(anilino) dimethylsilane and bis(anilino) phenylmethylsilane. These compounds may be prepared by allowing aniline to react with the appropriate dialkyl or arylalkyldichlorosilane in the presence of 2,3,6-trimethylpyridine according to the method of Curry et al. [J. Appl. Polymer Sci. 9, 295 (1965)]. The diaryl or dialkyl dichlorosilanes are commercially available.

The following non-limiting examples illustrate preferred embodiments of the invention.

EXAMPLE 1

Preparation of Poly(4,4'-diphenylsiloxy)benzalazine (Poly-4,4'-(-DPS)-BZ).

The apparatus used in these melt condensation reactions was an all-glass system having polymerization tubes 2.5 cm in diameter and 10.5 cm long. The reaction vessel was equipped with two concentric tubes which extend to the bottom of the polymerization tube. The outer tube was open at both ends to allow the passage of a small volume of dry nitrogen through the reaction mixture. The inner tube was sealed at one end to allow for the insertion of a thermocouple. A side-arm which served as the aniline take-off was attached to the vessel directly above the polymerization zone and led to a cold trap. The system was equipped with a two-way valve that allowed the polymerization to be conducted either under vacuum or with nitrogen purge.

Into the polymerization apparatus were placed 2 moles of 4,4'-dihydroxy-1,1'-benzalazine and 3 moles of bis(anilino)diphenylsiloxane. The two monomers were intimately mixed and the apparatus was purged with dry nitrogen for 1 hour. The reaction mixture was maintained at 170°C for 24 hours and the aniline which evolved was collected in a cold trap at -78°C. During the reaction, nitrogen was slowly bubbled through the melt to stir the reaction mixture and to help drive off the liberated aniline. The pressure of the system was reduced to 10 torr of nitrogen during the late stages of the reaction. Upon completion of reaction, the system was brought to atmosphere pressure with nitrogen and the heating was discontinued. This procedure gave poly(4,4'-diphenylsiloxy)benzalazine of molecular weight of 10,000 with 84% converstion.

About 10 mg. of the poly(4,4'-(diphenylsiloxy)-benzalazine POLY-4,4'-(DPS)-BZ as prepared above and that had been previously purified by methanol precipitation, was placed between two sheets of clean glass. Upon heating the glass sandwich to 190°C and maintaining the laminate at 190°C under light pressure for 30 minutes, the two glass sheets were bonded together.

Poly(4,4' diphenylsiloxy)benzalazine (POLY-4,4'-(DPS)-BZ polymers were also prepared under a variety of conditions, but following the general outline given above. The reaction time was varied from one hour to 24 hours and the temperature varied from 170°C to 230°C. The monomer ratio of the arylazine to the silylamine was varied from 1:0.8 to 2:3 and in all cases polymers satisfactory for the purposes of the present invention were obtained.

The following polymers were made by the process of Example 1.

EXAMPLE 2

Poly-2,2'-dimethoxy-5,5'(diphenylsiloxy)benzalazine, POLY-2,2'-DM-5,5'-(DPS)-BZ.

EXAMPLE 3

Poly-4,4'-(diphenylsiloxy)-dibenzidene-p-phenylenediamine, POLY-4,4'-(DPS)-DBPD.

EXAMPLE 4

Poly-2,2'-dihydroxy-6,6'-(diphenylsiloxy)naphthalazine, POLY-2,2'-DH-6,6'-(DPS)-NZ.

EXAMPLE 5

Poly-2,2'-dihydroxy 7,7'-(diphenylsiloxy)naphthalazine, POLY-2,2'-DH-7,7'-(DPS)-NZ.

EXAMPLE 6

Poly-2,2'-dihydroxy-5,5'-(diphenylsiloxy)benzalazine, POLY-2,2'-DH-5,5'-(DPS)-BZ.

The infrared spectra of all polymers were obtained. They exhibit the 1610 cm$^{-1}$ absorption band attributed to the C=N linkage while the bands between 815 and 840 cm$^{-1}$ are assigned to the C—H out-of-plane deformation in the 1,4-disubstituted aromatic rings. In addition, the infrared spectrum contains all of the bands between 690 and 720 cm$^{-1}$ attributed to the monosubstituted benzene rings attached to silicon while the bands observed at 1429 and 1125 cm$^{-1}$ may be assigned to the silicon phenyl linkage. The presence of the bands at 1250 and 1050 cm$^{-1}$ attributed to the siliconphenoxy and Si—O—C linkages, respectively, confirm that the polymers have the general formula indicated.

The molecular weight of the polymers was found to depend on temperature, reaction time and the ratio of monomers. In general, the formation of low molecular weight products was avoided by maintaining the reaction temperature below the decomposition point of the arylazine and by keeping the ratio of silylamine to arylazine at about 3:2. When the reaction temperatures were greater than 200°C, low molecular weight, insoluble copolymers were obtained. Upon lowering the reaction temperature from 230° to 195°C and maintaining the same ratio of silylamine to arylazine in the two experiments, a material was obtained which was soluble in tetrahydrofuran and had a molecular weight which was an order-of-magnitude greater than that obtained by reaction at the higher temperatures. Thus, the preferred ceiling temperature was established at 195°C.

The importance of the silylamine to arylazine ratio and temperature was also found in the condensation of 2,2'-dimethoxy-5,5'-dihydroxybenzalazine 2,2'-DM-5,5'-DHBZ. An increase in molecular weight was accompanied by nearly complete reaction and gave polymer with a molecular weight of 31,000. The same pattern was seen in the condensation of 4,4'-dihydroxydibenzidene-p-phenylenediamine 4,4'-DH-DBPD, 2,2',6,6'-tetrahydroxynaphthalazine 2,2',6,6'-THNZ, 2,2',7,7'-tetrahydroxynaphthalazine, 2,2', 7,7'-THNZ. The ratio of monomers and the selection of reaction temperature controls the solubility and molecular weight of the resulting polymers. Although within each polymer high molecular weight and good solubility in tetrahydrofuran was favored by maintaining the silylamine to arylazine ratio at about 3:2, all of the resulting linear polymers had the same softening point; 180°C and a density of 1.16 g/cc.

Figure 2:
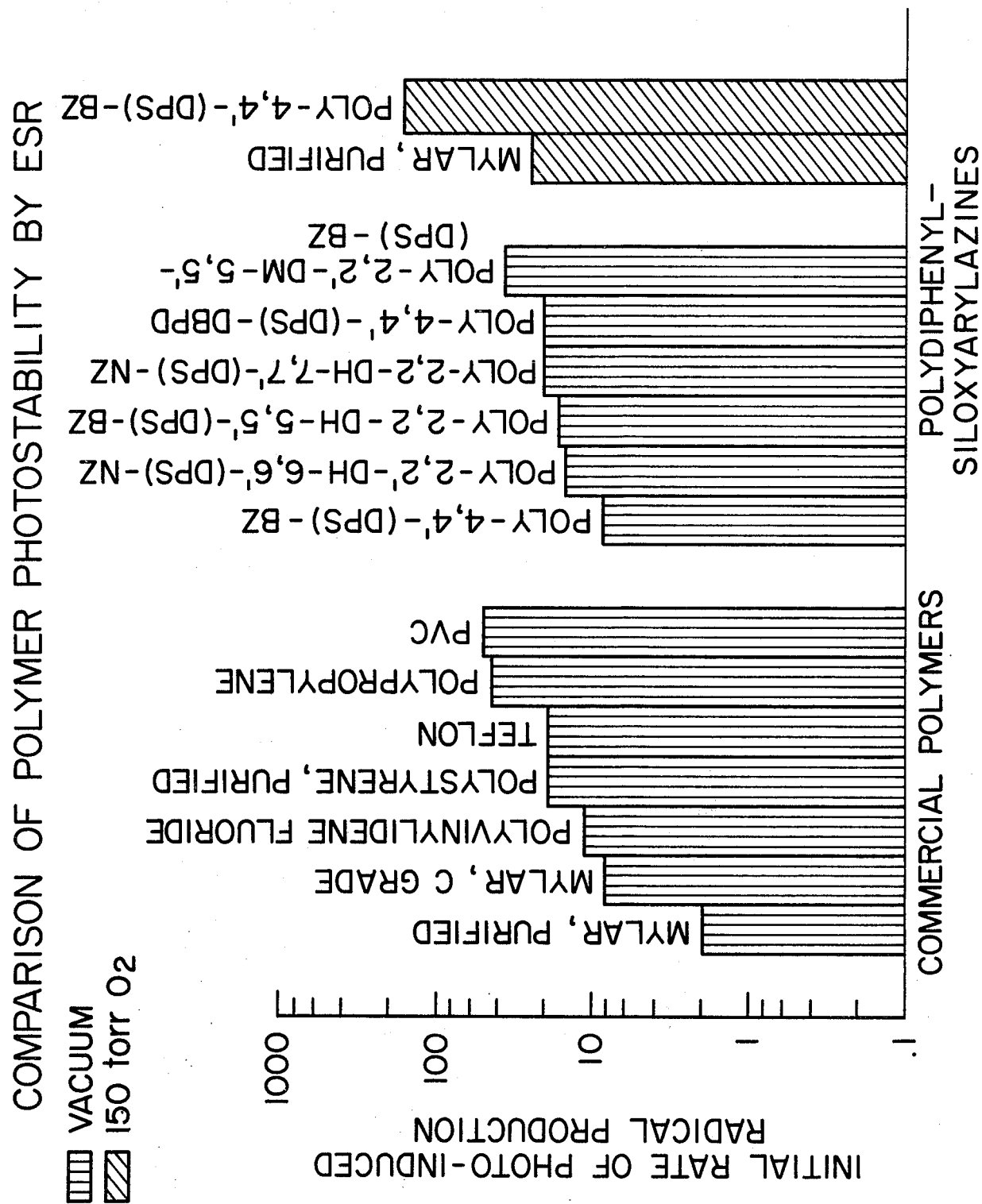
FIG. 2 is a graph showing a comparison of polymer photostability of polymers made in accordance with the present invention as compared with commercial polymers of the prior art.
Figure 3:
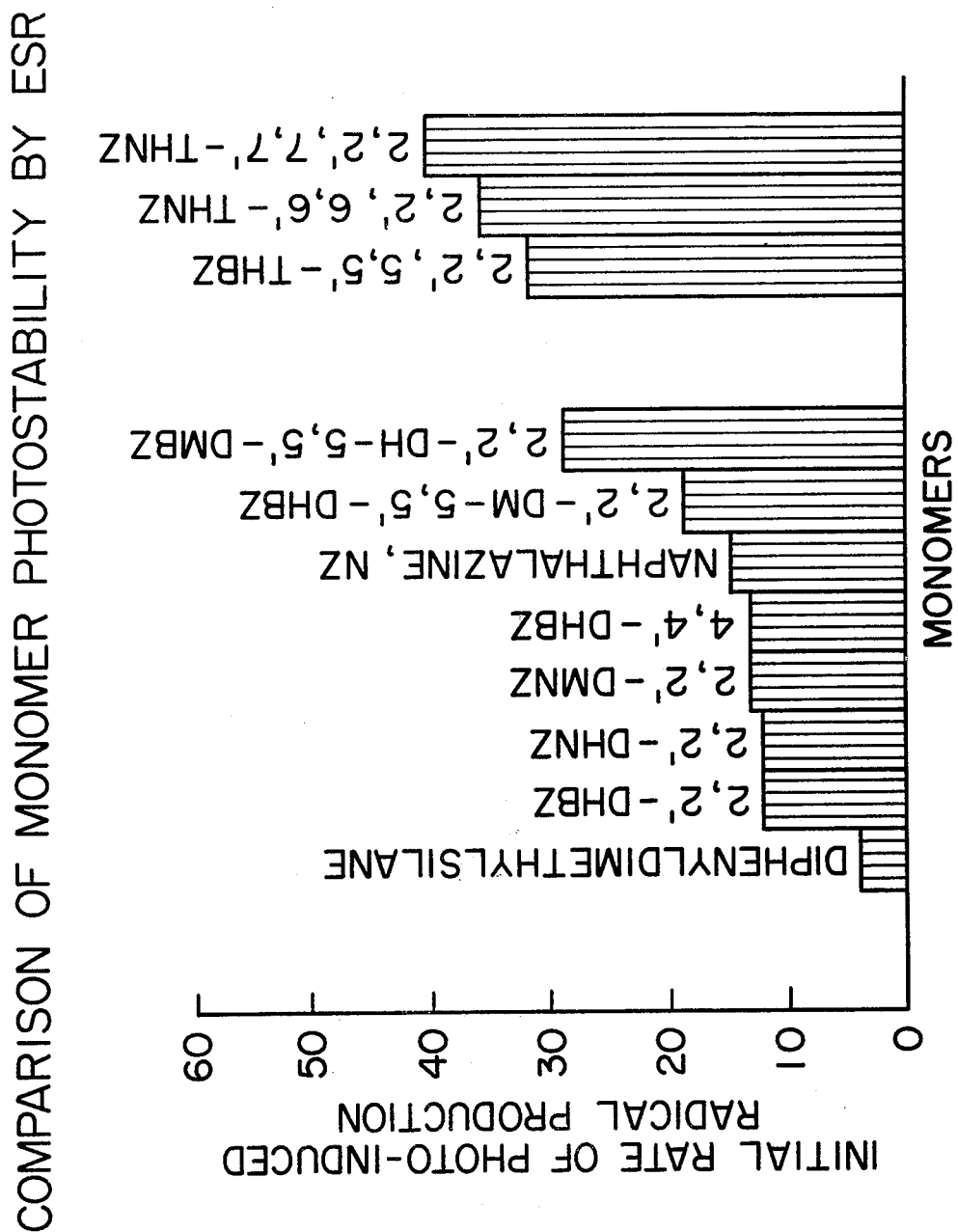
FIG. 3 is a graph showing the rate of free radical production of various monomers made in accordance with the present invention.

The polymer composition had a great effect on the thermal and photostability of the poly(diphenylsiloxy)arylazines. The thermal stability of the polymers was determined by measuring the temperature dependence of their weight loss using a thermogravimetric balance and the results are plotted in FIG. 1. The photostability of the polymers was determined by ultraviolet irradiation of the polymers and monomers in the optical cavity of an electron spin resonance (ESR) spectrometer. The initial rates of photo-induced radical production, in arbitrary units of radicals per minute were obtained by measuring the ESR signal strength and are plotted in FIG. 2 for the polymers and in FIG. 3 for the monomers. For purposes of comparison, the rates of radical production are used as a criterion of ultraviolet stability. A comparison of the thermogravimetric, FIG. 1, and electron spin resonance analysis, FIG. 2, shows that polymers that do not possess ortho hydroxyl groups exhibit the greatest thermal and photochemical stability. For example, poly-4,4'(diphenylsiloxy) benzalazine POLY-4,4'-(DPS)-BZ shows little weight loss at 300°C and has the lowest rate of photo-induced radical production of the arylazine polymers. The nature of the aromatic ring appears to have little influence on the photostabilities of these molecules. In general, as shown by comparing FIGS. 2 and 3, the structural features of the monomeric azines were transferred to the corresponding polymers because the polymers appear to be about a factor of two more ultraviolet stable than the related monomer, and the polymers are all more ultraviolet stable than a typical silane, diphenyldimethylsilane.

All of the polymers exhibit varying degrees of photostability when irradiated at 2537 and 1848A as displayed in FIG. 2. Since the polymers degrade by different mechanisms, a straightforward comparison is often difficult to make, however, using the initial rate of photo-induced radical production as a criterion of photostability, it is seen that the poly(diphenylsiloxy) arylazines are as ultraviolet stable as polytetrafluoroethylene, Teflon, or polyethyleneterephthalate PET, (MYLAR) and are more stable than many conventional polymers currently in widespread use. The presence of oxygen at 1 torr enhanced the initial rate of radical production by approximately a factor of 10 in the examples of poly(4,4'-diphenylsiloxy) benzalazine POLY-4,4'-(DPS)-BZ and polyethyleneterephthalate PET, (MYLAR).

We claim:
1. As a new composition of matter: 2,2',6,6'-tetrahydroxynaphthalazine (2,2',6,6'-THNZ).
2. As a new composition of matter: 2,2',7,7'-tetrahydroxynaphthalazine (2,2',7,7'-THNZ).
3. As a new composition of matter: 2,2',7,7-tetraacetoxynaphthalazine (acetate ester) (2,2',7,7'-TANZ).
4. As a new composition of matter: 2,2'-dihydroxy-5,5'-dimethoxybenzalazine (2,2'-DH-5,5'-DMBZ).
5. As a new composition of matter: 2,2'-diacetoxy-5,5'-dimethoxybenzalazine (acetate ester) (2,2'-DA-5,5'-DMBZ).
6. As a new composition of matter: 2,2',5,5'-tetrahydroxybenzalazine (2,2',5,5'-THBZ).
7. As a new composition of matter: 2,2'-dimethoxy-5,5'-dimethoxybenzalazine (2,2'-DM-5,5'-DMBZ).

* * * * *